United States Patent [19]
Bogle et al.

[11] Patent Number: 5,461,906
[45] Date of Patent: Oct. 31, 1995

[54] APPARATUS FOR CONFIRMING THE PRESENCE OF A LEAK IN A LIQUID STORAGE TANK

[75] Inventors: Tom G. Bogle; John E. Tuma, both of Houston; Barry N. Williams, Rosharan, all of Tex.

[73] Assignee: Tanknology Corporation International, Houston, Tex.

[21] Appl. No.: 191,463

[22] Filed: Feb. 4, 1994

Related U.S. Application Data

[62] Division of Ser. No. 65,077, May 20, 1993, which is a continuation of Ser. No. 773,354, Oct. 7, 1991, abandoned.

[51] Int. Cl.⁶ .................... G01M 3/24; G01M 3/32
[52] U.S. Cl. .................... 73/49.2; 73/40; 340/618
[58] Field of Search .................... 73/49.2 T, 40, 73/49.2 R, 40.5; 340/618, 621

[56] References Cited

U.S. PATENT DOCUMENTS

| | | | |
|---|---|---|---|
| 2,912,852 | 11/1959 | Trinneer | 73/49.2 |
| 3,439,837 | 4/1969 | Hearn et al. | 222/52 |
| 3,580,055 | 5/1971 | White | 73/49.2 |
| 3,626,760 | 12/1971 | Briggs et al. | 73/40.7 |
| 3,793,876 | 2/1974 | Oswald | 73/46 |
| 3,982,421 | 9/1976 | Wallace | 73/40 |
| 4,012,945 | 3/1977 | Bergstrand | 73/49.2 |
| 4,161,957 | 7/1979 | Schoellkopf | 137/205 |
| 4,172,477 | 10/1979 | Reich | 141/8 |
| 4,176,543 | 12/1979 | Nolte et al. | 73/40.5 A |
| 4,246,776 | 1/1981 | Thompson | 73/40.5 A |
| 4,309,576 | 1/1982 | Corrigan | 179/110 A |
| 4,350,038 | 9/1982 | Soncrant | 73/49.2 |
| 4,435,974 | 3/1984 | Fuchs et al. | 73/40.5 A |
| 4,442,702 | 4/1984 | Sawada | 73/49.2 |
| 4,462,249 | 7/1984 | Adams | 73/40.5 A |
| 4,474,054 | 10/1984 | Ainley | 73/49.2 |
| 4,523,454 | 6/1985 | Sharp | 73/49.2 |
| 4,534,208 | 8/1985 | Macin et al. | 73/49.3 |
| 4,561,291 | 12/1985 | Ainley | 73/49.2 |
| 4,649,739 | 3/1987 | Horner | 73/49.2 |
| 4,739,648 | 4/1988 | Horner | 73/49.2 |
| 4,785,659 | 11/1988 | Rose et al. | 73/40.5 A |
| 4,809,538 | 3/1989 | Fisch | 73/40.5 A |
| 4,850,223 | 7/1989 | Carlin et al. | 73/49.2 |

(List continued on next page.)

FOREIGN PATENT DOCUMENTS

| | | |
|---|---|---|
| 2617285 | 12/1988 | France. |
| 1142084 | 1/1963 | Germany. |
| 59-170739 | 9/1984 | Japan. |
| 648665 | 3/1985 | Switzerland. |
| 1049882 | 11/1966 | United Kingdom. |
| 8604675 | 8/1986 | WIPO. |

OTHER PUBLICATIONS

Gilbarco Inc. brochure: *The Gilbarco Precision Tank Test System* (Date unknown, but brochure bears 1992 copyright notice), 4 pp.

Primary Examiner—Hezron E. Williams
Assistant Examiner—J. David Wiggins
Attorney, Agent, or Firm—Vaden, Eickenroht, Thompson & Feather

[57] ABSTRACT

Apparatus for confirming the presence or absence of leaks in a liquid storage container, particularly in partially filled underground storage tanks, subjected to partial vacuum for the purpose of testing the tank for the presence of a leak in the area above the liquid using a hydrophone or microphone either positioned in or attached to the container to detect the sound produced by the ingress of fluid into the container as a result of the vacuum. The ingress of fluid is confirmed by recording and observing the vacuum pump on/off cycles that define a time period for the system to change from a high vacuum state at a first predetermined pressure toward a low vacuum state at a second predetermined pressure, with the pump operated to restore tank vacuum level at the end of each period back to the first predetermined pressure, such observed trends of the measured patterns in the on/off cycles for a leaking container being distinguishable from the on/off cycles for a non-leaking container.

10 Claims, 1 Drawing Sheet

U.S. PATENT DOCUMENTS

| | | | |
|---|---|---|---|
| 4,852,054 | 7/1989 | Mastandrea | 364/509 |
| 4,876,530 | 10/1989 | Hill et al. | 340/605 |
| 4,896,528 | 1/1990 | Lewis | 73/40.7 |
| 4,896,535 | 1/1990 | Duckart et al. | 73/290 V |
| 4,979,390 | 12/1990 | Schupack et al. | 73/38 |
| 4,993,257 | 2/1991 | Lagergren | 73/49.2 |
| 5,042,290 | 8/1991 | Geisinger | 73/40.5 R |
| 5,052,215 | 10/1991 | Lewis | 73/40.5 A |
| 5,117,677 | 6/1992 | Hendershot et al. | 73/49.2 A |
| 5,319,956 | 6/1994 | Bogle et al. | 74/640.5 |

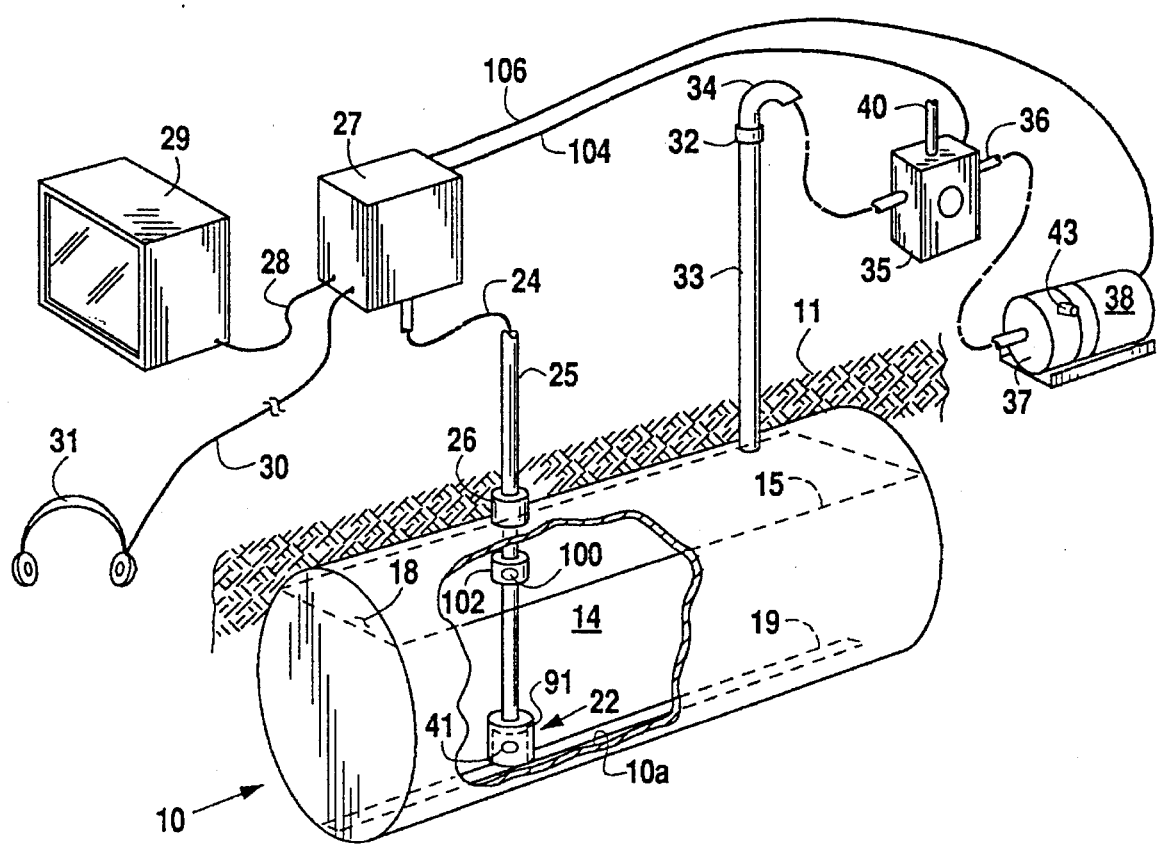
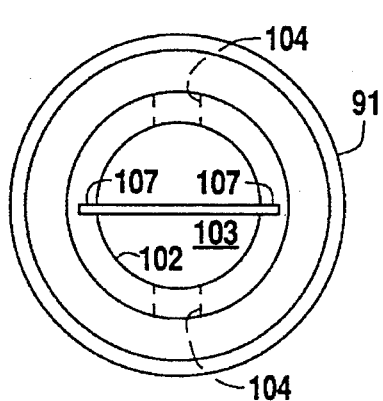
Fig. 2
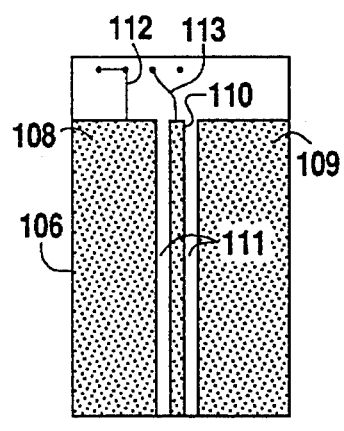
Fig. 3
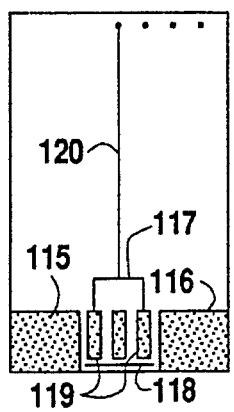
Fig. 4

APPARATUS FOR CONFIRMING THE PRESENCE OF A LEAK IN A LIQUID STORAGE TANK

BACKGROUND OF THE INVENTION

This application is a divisional application of copending application Ser. No. 08/065,077, filed May 20, 1993, now issued as U.S. Pat. No. 5,319,956 on Jun. 14, 1994, which is a continuation application of application Ser. No. 07/773,354, filed on Oct. 7, 1991, now abandoned.

The present invention relates to the detection of a perforation in the wall of a liquid storage container. More particularly, the present invention relates to an improvement to the method described in U.S. Pat. No. 4,462,249, commonly assigned to the assignee of the present invention and hereby incorporated it its entirety by this specific reference thereto, for detecting such perforations by evacuating the tank and acoustically detecting the bubbles that are formed in the liquid stored in the container as a result of the passage of air through any perforation(s) that may be present.

Although the method described in U.S. Pat. No. 4,462,249 is used successfully and extensively for the testing of such liquid storage containers as the underground gasoline tanks of a service station, there are instances in which it is useful to either confirm the result of that testing method or to increase the leak detection capability. The latter is particularly desirable in that, although at present the applicable federal regulations prohibit leakage of gasoline from such facilities at a rate exceeding 0.1 gallons per hour, on information and belief, those regulations are soon to be changed to perhaps reduce that maximum permissible rate by half. Further, the ability to detect smaller leaks may yield useful data as to the expected life of a particular storage tank that can be used to plan the maintenance of the tank and to prevent the occurrence of an environmentally significant leak.

Such tanks also present some unique leak detection problems for which increased detection capability is useful. For instance, many such tanks do not themselves have perforations that cause the loss of gasoline therefrom; the leak is actually located in the connections and/or lines leading out of the tank. The leak may also be in the vapor recovery line. Likewise, if the tank is installed below the water table or the perforation is near the bottom of the tank and the tank is nearly filled with gasoline, the leak may be difficult to detect by the method described in U.S. Pat. No. 4,462,249.

It is therefore an object of the present invention to provide a method of confirming the presence of a leak in a liquid storage tank or other container.

Another object of the present invention is to provide a method having increased leak detection capability.

Another object of the present invention is to provide a method of detecting a leak in a liquid storage container regardless of the location of the perforation from which the liquid leaks in the tank and regardless of whether the perforation is located above or below the level of the liquid in the container.

Another object of the present invention is to provide a method having increased leak detection capabilities for use in a liquid storage container that is only partially filled with liquid.

SUMMARY OF THE INVENTION

These objects, and the advantages of the present invention, are achieved by providing a method of confirming the presence of a leak in a liquid storage tank or other container that comprises closing all entry and exit passage connections to the tank to be tested, connecting a vacuum pump to the tank for drawing a partial vacuum therein, and sensing the vacuum pressure level within the tank. The pump is turned off at a first predetermined vacuum pressure level and is turned on at a second predetermined vacuum pressure level, the second level being higher than the first, and the time periods of pump on-off cycling are measured. Off cycles of relatively unchanging duration serve as confirmation of the presence of a leak in the tank and off cycles of increasingly longer duration confirm the absence of a leak. In a particularly preferred embodiment, the method also includes simultaneously acoustically detecting the sound produced by the ingress of fluid, whether it be air or water, from outside the tank through any perforation in the wall of the tank that may be present and from which the liquid stored therein may leak.

The present invention is also a method of determining whether a container that is partially filled with a liquid will leak the liquid comprising positioning an audible detection means in the container to be tested, closing the entry and exit connections to the container, connecting a vacuum pump to one of the entry or exit connections of the container, and drawing a vacuum in the container. The output signal produced by the audible detection means is then monitored for the sound produced by the ingress of the fluid surrounding the container into the container as a result of the vacuum drawn therein.

BRIEF DESCRIPTION OF THE DRAWINGS

FIG. 1 illustrates a diagrammatic view of one type of apparatus that is used for testing a liquid container such as an underground storage tank for leaks in accordance with the method of the present invention.

FIG. 2 illustrates an end view of the water level sensor mounting of the probe shown in FIG. 1.

FIGS. 3 and 4 show opposite sides of a printed circuit board forming part of the probe of FIG. 1.

DETAILED DESCRIPTION OF THE PREFERRED EMBODIMENT

As shown in FIG. 1, in a typical installation in which the leak testing method of U.S. Pat. No. 4,462,249 is utilized, an underground fuel storage tank 10 is buried in the ground 11 and may be surrounded by backfill (not shown). The tank 10 contains a body of liquid 14 hydrocarbon fuel, for example gasoline, or other chemical hydrocarbon having a liquid surface 15.

A body of water 19 is shown in tank 10 below the fuel 14, the water 19 either having entered through the perforation 18 in the wall of tank 10 which might be located below the water table or collected by condensation. The perforation 18 may, of course, be located below the liquid surface 15, in which case bubbles (not shown) would form in the liquid 14 when tank 10 is evacuated as described below. It will be appreciated that the liquid 14 will tend to leak outwardly of the tank through the perforation 18 since pressure in the tank 10 is greater than the outside, so that the bubbles would not normally be present. Water 19 may collect at the bottom of the tank as a result of condensation at the top of the tank; the denser water sinks and collects at the bottom rather than passing through a perforation such as is shown at 18.

In conducting the tank leakage test, the pressure within the tank 10 is reduced below the pressure outside of the tank 10 to deliberately induce the inflow of the fluid (air or water) surrounding the tank 10 into the tank 10 through perforation 18, all as described in more detail in the above-incorporated U.S. Pat. No. 4,462,249. The apparatus for use in conducting that test includes a first probe 22, which is immersed in the liquid 14 in storage tank 10 and located near the bottom 10a thereof and a second probe 102 preferably located above liquid surface 15 in the ullage of tank 10. The probes 22 and 102 are suspended within the tank 10 by a cable 24 passing through a fill pipe 25 forming a part of the tank 10. The cable 24 is suspended from a closure 26 which hermetically seals the fill pipe 25. The probes 22 and 102 include a hydrophone, or microphone, shown schematically at reference numerals 41 and 100, respectively, for detecting the acoustic signatures of the bubbles and/or the sound produced by the ingress of air through the perforation 18 as described in U.S. Pat. No. 4,462,249, as well as other sensors, each of the sensors being connected through the cable 24 to a control and display unit 27.

In addition to the hydrophone 41, the lower probe 22 contains a water level sensor mounting 91, shown in shadow lines in FIG. 1. As shown in FIG. 2, the water level sensor mounting 91 has a cylindrical portion 102 defining a hollow interior space 103, the wall 102 being provided with opposed slots 104 through which the fuel in the interior of the tank 10, and any water such as the body of water 19 of FIG. 1, can enter the hollow interior 103. A printed circuit board 106 extends transversely across the hollow interior 103 and has opposite longitudinal edges thereof received in recesses 107 in the cylindrical wall 102.

Opposite sides of the printed circuit board 106 are shown in FIGS. 3 and 4. Referring first to FIG. 3, one side of the board 106 has printed thereon three electrodes, 108, 109 and 110, the latter being spaced from the electrodes 108 and 109 by gaps 111. Conductors 112 and 113 are provided for connecting the electrodes 108 and 110, respectively, to the circuitry described in more detail in the above-incorporated U.S. Pat. No. 4,462,249.

The opposite side of the board 106 (FIG. 4) is formed with electrodes 115, 116, and 117 which are interconnected by conductor 118. Electrodes 115 and 116 are also connected through the board to the electrodes 109 and 108, respectively. Electrodes 119 are connected to a conductor 120 for connection, in turn, to the circuitry described in more detail in the above-incorporated U.S. Pat. No. 4,462,249. The electrodes 108 and 109, being connected through electrodes 115 and 116 and conductor 118, act as a single electrode spaced by a single gap from the electrode 110, which extends parallel to the axis of the probe. Upon immersion of the lower end of the probe 22 in the water 19, the electrical resistance across the gap will vary in accordance with the depth of the water 19. This electrical resistance is calibrated to represent the depth of the water 19. Of course, it is evident that as the water level increases, the electrical resistance measured between the electrodes changes, until the electrodes are completely immersed.

The electrodes 115, 116, and 117 on the back of the board 106 act as a common first reference electrode, and the electrodes 119 act as a common second reference electrode separated by a reference gap from the first reference electrode. The first and second reference electrodes, and their gap, are located at the lowermost end of the printed circuit board 106 so that, when the water level sensor is in use, these reference electrodes and their gap are disposed below a minimum water level of the body of water 19, the depth of which is to measured. The signal from the circuitry described in the above-incorporated U.S. Pat. No. 4,462,249 is output to the control and display unit 27 through the cable 24.

The control and display unit 27 is connected by cable 28 to a computer monitor 29 and cable 30 to a pair of headphones 31 (or alternatively, to a loudspeaker, not shown).

The tank 10 also includes a vent pipe 33 to which a flexible hose 34 is connected by a coupling 32. The flexible hose 34 is connected to an evacuation control unit 35, which in turn is connected by a flexible hose 36 to a vacuum pump 37 which is driven by an electric motor 38. The evacuation control unit 35 is also connected by a flexible hose 40 to a gas source (not shown) containing nitrogen or other inert gas. Depending upon the liquid in the tank being tested, it is useful to use stainless steel fittings and stainless steel, teflon-lined vacuum hoses to reduce reactivity with chemicals.

Gases evacuated from tank 10 are exhausted to the atmosphere through the outlet 43 from vacuum pump 37. In a preferred embodiment, the evacuated gases are exhausted to the atmosphere through a condensation unit (not shown) as described in co-pending application Ser. No. 07/612,301, also assigned to the assignee of the invention described herein.

The operation of the above-described apparatus is as follows. The probes 22 and 102 are inserted into the tank 10 through the fill pipe 25 and positioned near the bottom of the tank 10 and in the ullage, respectively. The fill pipe 25 is hermetically sealed by the closure 26. The flexible hose 34 is connected to the vent pipe 33 by the coupling 32.

Using the appropriate control valve settings on control unit 35, inert gas is routed from hose 40 into the ullage of tank 10 to pressurize tank 10 and reduce the likelihood of untoward events. Pump 37 is then driven by the motor 38 to decrease the pressure in the tank 10 by discrete amounts in accordance with the operator selected parameters input to control and display unit 27 and switched through the valves in control unit 35. The pressure is reduced until sufficient vacuum is achieved to offset the static head pressure of the liquid 14 in tank 10 so that the entire tank, top to bottom 10a, is negative with respect to ambient pressure. That vacuum level, set using control unit 35, is referred to herein as a first predetermined vacuum pressure level. When the pressure in the ullage of tank 10 has been reduced to the point at which the ambient pressure exceeds the combined pressure of the ullage gases and the pressure head of the liquid 14 above any perforation 18 which may be present, e.g., the first predetermined level, air passes through the perforation 18 creating bubbles in the liquid 14 if perforation 18 is located below liquid surface 15.

As the bubbles break away from the internal wall surface of the tank 10, they emit the characteristic sounds or acoustic signatures which are detected by the hydrophone 41, which produces repetitive signals. These acoustic signatures are produced as the formed bubbles change shape as they rise toward the surface. The pressure forces, buoyancy forces and the surface tension of the liquid 14 in the tank 10 cause the bubble shape to deform as the bubble rises, and these changes in shape or "volume pulsations" emit acoustic waves which are detected by hydrophone 41. As noted above, this method for characterizing the acoustic signatures of bubbles within a storage tank to detect leaks is described in detail in U.S. Pat. No. 4,462,249.

Of course, the perforation 18 in the tank 10 may be located above the surface 15 of the liquid 14 stored therein such that no bubbles are formed. In that circumstance, the ingress of the air from outside of tank 10 can often still be heard using the hydrophone/microphone 100 located in the second probe 102 positioned in the ullage of tank 10 as a hiss or whistle. It is also common in installations in which the tank 10 is partially or completely below the water table for the water in the water table to be drawn into the tank 10 by the reduction in pressure; when the perforation is located above the surface 15 of liquid 14 and below the water table, the sound of the influx of water can also be detected by the hydrophone/microphone 100; this influx is also detected as a variation in the level of the body of water 19 by the water level gauge in the probe 22. Hence, reference is made herein to the ingress of the fluid surrounding the tank 10 or other liquid storage container, both air and water being considered "fluids".

When the pressure within the ullage of the tank 10 is reduced, the normal evaporative rate of the stored liquid, often a liquid such as an aromatic solvent or other chemical having a low vapor pressure, increases. Consequently, controls (not shown) are preferably provided in evacuation control unit 35 such that the motor 38 of vacuum pump 37 is automatically triggered at a second predetermined vacuum pressure level selected by the operator using control and display unit 27 to evacuate the gas in the ullage of tank 10 to maintain a desired reduction in the pressure in tank 10. As a general rule, it is preferred to use a reduction in pressure which is as small as possible to induce a negative pressure throughout the tank 10 so as to induce the ingress of fluid and formation of the bubbles in liquid 14. A relatively small reduction in vacuum pressure decreases the amount of liquid 14 which vaporizes in the first place, and also prevents what is referred to as "champagning" e.g., formation of a continually multiplying stream of bubbles which effectively covers up the useful acoustic information emitted by bubbles. It is also preferred, although not required, to test a tank 10 which is at least about half filled with stored liquid 14 so that a smaller reduction in the pressure in the tank can be used during the method of the present invention.

Especially in the case of storage tanks containing fuels and solvents, relatively large amounts of vapor must be removed from the ullage during evacuation of tank 10 and then, once the first predetermined vacuum pressure level has been reached, vaporization causes the pressure to start to rise until the second predetermined pressure level is reached and display and control unit 27 activates the pump motor 38. The vacuum pump 37 operates until the first predetermined pressure is restored. The pump 37/pump motor 38 may cycle on and off several times to maintain the vacuum pressure between the first and second predetermined levels, particularly in warm ambient conditions and in the case of liquids such as those with high vapor pressures. This cycling occurs even without reference to whether a leak is present in the tank 10.

As set out above, there are circumstances in which these methods are not capable of detecting leaks, and for that reason, the display control unit 27 is provided with cables 104 and 106 connecting control unit 27 to evacuation control unit 35 and the motor 38 of vacuum pump 37, respectively, and electrically activated means for sensing operating status and controlling activated means for sensing operating status and controlling the operation of same (not shown). The status/control means includes, in a preferred embodiment, solenoids for opening and closing the appropriate valves in evacuation control unit 35 and low voltage on/off circuitry for monitoring the operating status and switching the motor 38, both as known in the art.

Using the data entry capabilities of control unit 27, first and second vacuum pressure levels, the second being higher than the first, are determined by the operator in accordance with the guidelines set out above. The control unit 27 then causes the appropriate exit connection to be made in evacuation control unit 35 from tank 10 and activates the motor 38 to draw a partial vacuum in tank 10. Motor 38 is switched off by control unit 27. The pressure in tank 10 then begins to rise, and when the second predetermined pressure is reached, control unit 27 switches the motor 38 of vacuum pump 37 back on and pressure is once again lowered to the first predetermined pressure. The time periods between pump on/off cycles are measured by an internal timer (not shown) in control unit 27 and an output produced to indicate whether the time periods increase in duration with each on/off cycle or are relatively constant in duration. The former confirms the absence of a leak, the latter confirms the presence of a leak.

The output produced by control unit 27 is preferably a printed output, and in an experiment conducted in accordance with the method of the present invention, using a relatively small capacity liquid storage tank (estimated capacity about 50 gallons) know to be tight (e.g., without leaks), predetermined vacuum pressure levels of −2.0 and −1.7 psig were selected. The printout from the printer (not shown) comprising a part of display and control unit 27 was as follows below:

| Elapsed Time (H:M:S) | Pressure (psig) | Event Description |
|---|---|---|
| 00:00:00 | — | Initiate |
| 00:00:30 | 16.88 | Start: probe activated |
| 00:01:00 | 1.27 | |
| 00:01:26 | 1.27 | Pressure set to −2.00 psig |
| 00:02:00 | 1.27 | |
| 00:02:20 | 1.26 | Pump enabled: relief valve closed |
| 00:02:20 | 1.27 | Pump motor on |
| 00:02:30 | −2.01 | Pump motor off |
| 00:03:00 | −1.74 | |
| 00:03:03 | −1.71 | Pump motor on |
| 00:03:04 | −2.01 | Pump motor off |
| 00:04:00 | −1.80 | |
| 00:04:52 | −1.71 | Pump motor on |
| 00:04:53 | −2.01 | Pump motor off |
| 00:05:00 | −2.07 | |
| 00:06:00 | −1.94 | |
| 00:07:00 | −1.86 | |
| 00:08:00 | −1.75 | |
| 00:08:10 | −1.71 | Pump motor on |
| 00:08:11 | −2.01 | Pump motor off |
| 00:09:00 | −1.90 | |

The on/off cycles of increasing duration confirmed the absence of any leak(s), or the "tightness" of the container under test. At approximately 9:10 elapsed time, a "leak" was induced in the tank by manually partially opening a valve (not shown) connected in the line 34 for the purpose of conducting this experiment. The printout continued as follows below:

| Elapsed Time (H:M:S) | Pressure (psig) | Event Description |
|---|---|---|
| 00:09:28 | −1.27 | Pump motor on |
| 00:09:29 | −2.02 | Pump motor off |
| 00:09:40 | −1.70 | Pump motor on |
| 00:09:42 | −2.01 | Pump motor off |
| 00:09:53 | −1.71 | Pump motor on |
| 00:09:54 | −2.00 | Pump motor off |
| 00:10:52 | −1.89 | |
| 00:10:05 | −1.71 | Pump motor on |
| 00:10:06 | −2.01 | Pump motor off |

| Elapsed Time (H:M:S) | Pressure (psig) | Event Description |
| --- | --- | --- |
| 00:10:17 | −1.71 | Pump motor on |
| 00:10:18 | −2.01 | Pump motor off |

The printout continued for several more minutes until the experiment was terminated at elapsed time 13:32, all the while exhibiting this same pattern of on/off cycles of approximately 10–11 second durations, confirming the presence of the "leak".

In this presently preferred embodiment, an internal oscillator in control unit 27 drives timer circuitry that continually polls the status of each of the pressure transducers in probes 22 and 102, valve position in evacuation control unit 35, operating status of motor 38, and so on to produce the above printout. However, control unit 27 may also be provided with software for timing the on/off cycles and producing an output, for instance, the switching on of an indicator light (not shown) on control unit 27 or a printed message monitor 29, to signal an operator when the on/off cycles are, for instance, of relatively constant duration, either to alert the operator to the presence of a leak that cannot be heard through headphones 31 or to confirm the presence of a leak that can be heard.

In another alternative embodiment, software is provided for producing an output from the trend shown by the pump motor on/off cycles. This latter alternative is particularly useful in connection with the testing of very large liquid storage containers, e.g., tens of thousands of gallons or more, because the on/off cycles during such tests are of such long duration that it is economically inefficient to have the operator and necessary test equipment on site for the multiple on/off cycles that must each be measured in serial fashion to confirm the presence or absence of a leak using a print-out as set out above. This time period can be decreased somewhat by reducing the difference between the first and second predetermined vacuum pressure levels, but by extrapolating the measured time periods from four or five pump motor on/off cycles, the total test time can be reduced.

Although the invention has been described in terms of the above presently preferred embodiments, those skilled in the art who have the benefit of this disclosure will recognize that certain changes can be made to these specific embodiments that do not change the manner in which the individual elements thereof function to achieve the intended result. For instance, pump motor on/off cycles need not be detected by polling. Given the sensitivity of the hydrophone/microphone positioned in the container being tested, the output signal of that device can be monitored, either by the operator or by sampling circuitry and appropriate software, for the frequency component corresponding to the frequency of the sound produced by the pump motor 38 or pump 37. A signal is then produced, for instance, by control unit 27, for signalling the operator when the frequency component is present. Likewise, the ingress of fluid into the container 10 if a leak is present need be detected by the operator if such circuitry and software is provided and an output produced for signalling the operator when the output signal of the hydrophone/microphone 41 or 100 includes that frequency component. Different signals can be produced, for instance, when the sound of bubbles in the liquid stored in the container is detected, when the ingress of air is detected, and when the ingress of water is detected. As a further example of such a change, the hydrophone/microphone 41 or 100 need not be suspended in the ullage or in the fluid 14 contained in the tank 10. It can also be attached to the inside of the tank 10, mounted in the closure 26, or even positioned on the outside of the container. All such changes are intended to fall within the spirit and scope of the following claims.

What is claimed:

1. Apparatus for testing a liquid storage tank for leaks comprising:

means for closing all entry and exit passages to the liquid storage tank to be tested;

a vacuum pump connected to the tank to be tested through said passage closing means for drawing a vacuum therein;

a pressure sensor within the tank to be tested; and a control unit operably connected to said vacuum pump and said pressure sensor, said control unit being provided with software for monitoring the output signal from said pressure sensor, turning said vacuum pump off when the output signal from said pressure sensor indicates that a first predetermined vacuum pressure level within the tank has been reached, turning said vacuum pump on when the output signal from said pressure sensor indicates that a second predetermined vacuum pressure level within the tank has been reached, said second pressure level being higher than said first pressure level, and measuring the time periods of pump cycling between on and off states, and comparing the duration of the time periods, with the monitoring of off cycles of relatively unchanging duration serving to confirm the presence of a leak in the tank and the occurence of off cycles of increasingly longer duration confirming the absence of a leak.

2. The apparatus of claim 1 additionally comprising means for acoustically detecting the sound produced by the ingress of air through a leak in the tank and the acoustical output produced by pump cycling sounds.

3. The apparatus of claim 2 wherein the acoustical detection means is located below the level of the liquid within the tank, the acoustical detection means being suitable for detecting a leak of outside air or outside liquid into the tank above or below the surface level of the liquid within the tank.

4. The apparatus of claim 1 additionally comprising means for detecting the sound produced by the ingress of air through a leak in the tank positioned within the tank.

5. The apparatus of claim 4 wherein the acoustical detection means is positioned in the tank above the level of the liquid stored therein.

6. The apparatus of claim 4 additionally comprising means for sampling the output of the acoustical detection means for a frequency component corresponding to the frequency of the sound produced by the ingress of air into the tank and for producing an output for signalling an operator when the output signal includes said frequency component.

7. The apparatus of claim 6 wherein the time periods of the pump cycling are measured by detecting the switching of the motor powering the vacuum pump on and off and an output is produced by said control unit for signalling an operator at the times when the motor switches on or off.

8. Apparatus for detecting a leak in an underground liquid storage tank having a body of water in the tank below the liquid contained therein comprising:

means for closing the entry and exit passages to the tank to be tested;

a vacuum pump connected to the tank to be tested through said means for closing the entry and exit passages, said vacuum pump drawing a partial vacuum in said tank;

a pressure sensor in the tank to be tested;

a water level sensor positioned at the bottom of the tank to be tested; and a control unit for (1) monitoring the output signal from said pressure sensor, (2) turning the vacuum pump off at a predetermined vacuum pressure level at which the entire tank to be tested, top to bottom, is negative with respect to ambient pressure, and (3) in the event of an increase in pressure from the predetermined vacuum pressure level, monitoring the output signal from said water level sensor, a pressure increase (a) without an increase in water level indicating the ingress of air through a leak in the tank located above the level of the liquid stored in the tank whether the bottom of the tank is below the water table or is above the water table; or (b) with an increase in water level indicating, when the bottom of the tank is below the water table, an ingress of water through a leak in the tank that is below the water table.

9. The apparatus of claim 8 additionally comprising means for acoustically detecting the sound produced by the ingress of air or water to confirm the presence of a leak.

10. The apparatus of claim 9 wherein the acoustical detection means is located below the level of the liquid in the tank, above the level of the liquid, or both above and below the liquid level in the tank.

* * * * *